United States Patent

Chigira

Patent Number: 5,418,588
Date of Patent: May 23, 1995

[54] APERTURE SIZE ADJUSTMENT DEVICE FOR A CAMERA WITH A STEPPING MOTOR DRIVE SOURCE

[75] Inventor: Tatsuo Chigira, Kanagawa, Japan

[73] Assignee: Canon Kabushiki Kaisha, Tokyo, Japan

[21] Appl. No.: 275,653

[22] Filed: Jul. 15, 1994

Related U.S. Application Data

[63] Continuation of Ser. No. 650,698, Feb. 5, 1991, abandoned.

Foreign Application Priority Data

Feb. 7, 1990 [JP] Japan ..................... 2-27730

[51] Int. Cl.⁶ .......................... G03B 9/08; H02K 21/12
[52] U.S. Cl. ................. 354/234.1; 354/271.1; 310/49 R; 310/156
[58] Field of Search ................. 354/234.1, 271.1; 310/49 R, 156

[56] References Cited

U.S. PATENT DOCUMENTS

| | | | |
|---|---|---|---|
| 3,978,356 | 8/1976 | Spiesberger | 310/49 R X |
| 4,952,859 | 8/1990 | Torisawa et al. | 354/271.1 X |
| 5,095,238 | 3/1992 | Suzuki et al. | 310/156 |

FOREIGN PATENT DOCUMENTS

| | | |
|---|---|---|
| 60-140934 | 9/1985 | Japan . |
| 60-141682 | 9/1985 | Japan . |
| 60-141683 | 9/1985 | Japan . |
| 62-240942 | 4/1988 | Japan . |
| 1-164258 | 9/1989 | Japan . |

Primary Examiner—Howard B. Blankenship
Assistant Examiner—J. K. Han
Attorney, Agent, or Firm—Robin, Blecker, Daley & Driscoll

[57] ABSTRACT

A light-quantity adjusting device, comprising light-blocking blades supported to be moveable and arranged to be moved for adjusting a quantity of light, a moving mechanism for moving the light-blocking blades and a stepping motor serving as a drive source for the moving mechanism. The stepping motor includes a rotor magnetized to $2n$ poles ($n=2, 3, 4, \ldots$), the center of magnetization in each pole of the rotor being deviated from the center of the pole, first and second stators each having a plurality of magnetic poles formed adjacent to the outer periphery of the rotor and first and second coils arranged on the first and second stators. The first and second stators are located so as to be mutually displaced by about 90 degrees in terms of electrical angle and being provided with two magnetic poles located so as to be mutually displaced by about 180 degrees in terms of electrical angle and further being located so as to be mutually displaced by about $90+180$ degrees times m ($m=0, 1, 2, \ldots$) in terms of electrical angle.

16 Claims, 3 Drawing Sheets

APERTURE SIZE ADJUSTMENT DEVICE FOR A CAMERA WITH A STEPPING MOTOR DRIVE SOURCE

This is a continuation under 37 CFR 1.62 of prior application Ser. No. 07/650,698, filed Feb. 5, 1991, now abandoned.

BACKGROUND OF THE INVENTION

1. Field of the Invention

This invention relates to a light-quantity adjusting device for use in a still camera, a video camera, etc.

2. Description of the Related Art

The non-interchangeable lens type camera, which is called the compact camera, generally has a light-quantity adjusting device serving both as the shutter and the diaphragm. In recent years, the use of the stepping motor as a drive source for the light-quantity adjusting device has become the mainstream. Meanwhile, the diaphragm for the interchangeable lens of the single-lens reflex camera, too, employs, in some cases, the stepping motor as a drive source.

To adapt such a stepping motor to the drive source of an electromagnetically-driven light-quantity adjusting device, as disclosed in Japanese Laid-Open Utility Model Applications No. Sho 60-141682, No. Sho 60-141683, No. Sho 60-140934, etc., the stepping motor is composed of an arcuate base plate, a rotor having its outer periphery magnetized to quadripole, a pair of stators of almost letter "U" shape and a pair of coils for exciting the respective stators.

Another form of the light-quantity adjusting device is also known in Japanese Laid-Open Patent Applications No. Sho 62-240942, No. Hei 1-164258, etc., where coils each have one piece of iron core in parallel with the shaft of the rotor and are wound around the iron cores, and a pair of stators each have two magnetic pole members positioned in a plane perpendicular to the rotor shaft and each having a plurality of magnetic pole elements confronting the outer periphery of the rotor.

By the way, in the light-quantity adjusting device with the stepping motor used as a drive source, in the case of, for example, the single-lens reflex camera, the actual size of opening of the diaphragm aperture is determined by setting a certain phase at which electric power starts being supplied to the stepping motor and counting the number of steps by which the rotor is rotated. For this reason, to attain a high accuracy of aperture control, a smaller angle of rotation of the rotor per step is desired.

Meanwhile, to avoid premature consumption of the battery serving as the electric power source, on account of a higher probability of making relatively long exposures, a high percentage of the period in which the current supply to the motor is cut off is more advantageous. On this account, it is desired to increase the number of stop positions, at which the rotor comes to stably stop due to the cogging torque, per revolution of the rotor.

In the conventional examples such as those disclosed in the aforesaid Japanese Laid-Open Utility Mode Applications No. Sho 60-141682, 60-141683 and 60-140934, however, although the number of pulses required for rotating the rotor by one revolution by using the known 1,2-phase current supply is 16, the number of the stable stop positions caused by the cogging torque is only four as it is equal to the number of magnetized poles. For this reason, even when making a relatively long exposure, the current supply to the coil must continue till the end of the exposure. Otherwise, one could not get the high accuracy of diaphragm aperture control. Hence, there is a problem of a very fast exhaustion of the battery serving as the electric power source.

Also, in the electromagnetically-driven light-quantity adjusting device such as those disclosed in the Japanese Laid-Open Patent Applications No. Sho 62-240942 and No. Hei 1-164258, the stators are disposed in a three-dimensional relation. Therefore, accurate arrangement of the phase of each magnetic pole is difficult to perform. Hence, there is a drawback that the accuracy of the size of opening of the diaphragm aperture is difficult to stably obtain at a high level.

Further, in the electromagnetically-driven light-quantity adjusting device disclosed in the Japanese Laid-Open Patent Application No. Hei 1-164258, the number of positions at which the rotor stops stably due to the cogging torque in response to the termination of current supply is equal to ½ of the number of positions at which the rotor can stop under the condition that the current supply continues. This is acceptable as the above number is relatively great. However, when the termination of current supply coincides with occurrence of an unstable stop position, it is impossible to specify the direction in which the cogging torque works, or determine whether the diaphragm is to move toward the minimum size of aperture opening by an amount equal to one step, or toward the full open aperture by that amount. As a result, there is a high possibility of occurrence of an error of ±1 step. Hence, a problem arises that the accuracy with which to control the size of aperture opening cannot be assured with high reliability under the condition that the current supply is cut off.

SUMMARY OF THE INVENTION

One aspect of this invention is that, as the light-quantity adjusting device employs a stepping motor as the drive source, many stable stop positions for the rotor caused by the cogging torque can be obtained despite the use of two-dimensional disposition of the stators, and the direction in which the rotor is to be pulled when the current supply is cut off can be specified at any of the stop positions at which the rotor comes to stop stably under the condition that the current supply continues, thereby producing advantages of preventing premature consumption of the battery from occurring even when the frequency of making long exposures is high, and of making it possible to adjust the light quantity with high accuracy and high reliability.

DETAILED DESCRIPTION OF THE PREFERRED EMBODIMENT

The present invention is next described in connection with an embodiment thereof applied to the diaphragm device in the interchangeable lens of the single-lens reflex camera.

Figure 1:
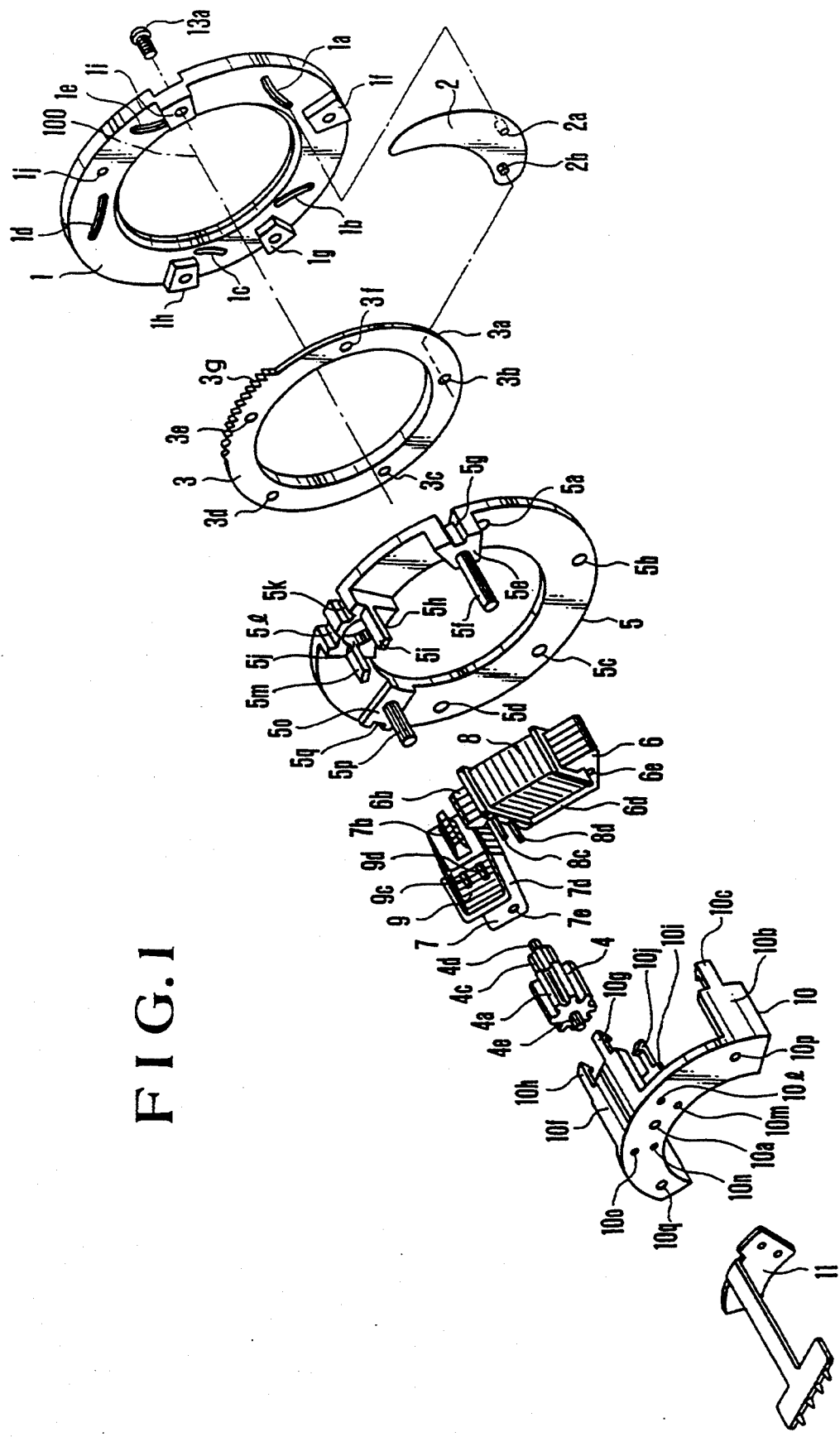
FIG. 1 is an exploded perspective view of an embodiment of a light-quantity adjusting device according to the invention.
Figure 2:
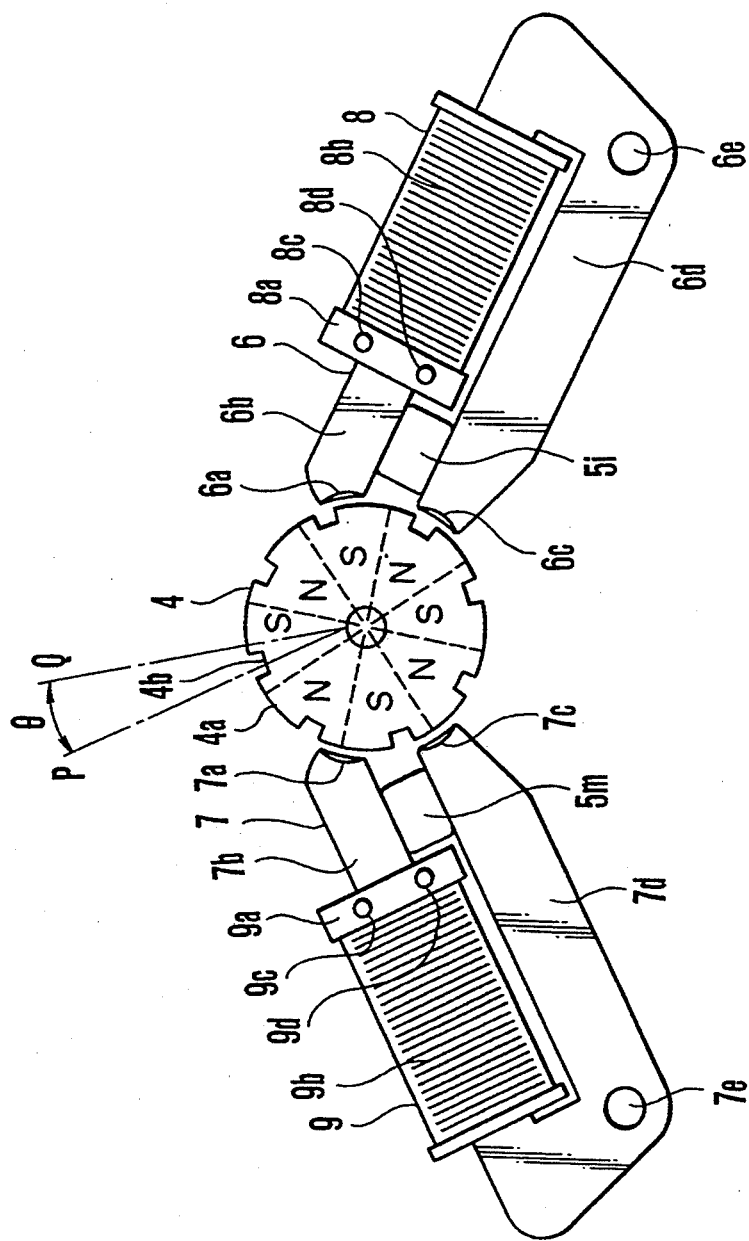
FIG. 2 is a front elevation view in enlarged scale of the stepping motor of FIG. 1.

Referring to FIG. 1 and FIG. 2, the electromagnetically-driven light-quantity adjusting device of the invention comprises a cam member 1, light-blocking blades 2 which constitute a light-blocking member, a rotary ring 3, a rotor 4, a stationary ring 5, a first stator 6, a second stator 7, a first armature coil 8, a second armature coil 9, a bearing member 10, and a flexible printed circuit board 11. On rotation of the rotor 4 of the stepping motor, because a gear 4c of the rotor 4 is in mesh with a gear 3g of the rotary ring 3 serving as opening-and-closing means, the rotary ring 3 rotates, so that the light-blocking blades 2 turns by a predetermined amount, the components causing such turning constituting a moving mechanism.

The details of each of these members are described below.

In FIG. 1, the cam member 1 is made of, for example, plastic and provided with a plurality of camming slots 1a, 1b, 1c, 1d and 1e (equal to the number of the light-blocking blades 2) and with convex portions 1f, 1g, 1h and 1i. The inner sides of the convex portions 1f, 1g, 1h and 1i with respect to an optical axis 100 define a common circle in which an outer diameter 3a of the rotary ring 3 fits, thus supporting the rotary ring 3 to rotate freely. Also, the convex portions 1f, 1g, 1h and 1i are provided with respective holes, through which screw fasteners 13a, 13b, 13c and 13d (13b–13d are not shown) pass to be inserted into threaded holes 5a, 5b, 5c and 5d, so that the cam member 1 is fixedly secured to the stationary ring 5.

For the light-blocking blades 2 made of, for example, plastic, a number of sheets equal to the number of camming slots 1a to 1e in the cam member 1 are used. In FIG. 1, only one of them is illustrated, and the others are omitted.

A first dowel 2a provided on the light-blocking blade 2 is fitted in the first camming slot 1a in the cam member 1, and a second dowel 2b likewise is fitted in a first hole 3b provided in the rotary ring 3.

The second to fifth light-blocking blades (not shown) have their first and second dowels fitted likewise in the respective camming slots 1b to 1e of the cam member 1 and in respective holes 3c to 3f provided in the rotary ring 3.

The convex portions 1f, 1g, 1h and 1i of the cam member 1 have a height higher than the sum of the thickness of the rotary ring 3 and the thickness of the light-blocking blade 2 by so large an amount that when the cam member 1 and the stationary ring 5 are in steady connection by the screw fasteners 13a to 13d under the condition that the rotary ring 3 and the light-blocking blades 2 are incorporated in the space therebetween, the rotary ring 3 is restrained from axial movement, while having a predetermined play. A gear 3g is provided in a portion of the outer periphery 3a of the rotary ring 3. This gear 3g engages with a gear to be described later of the rotor.

The cam member 1 is provided with a bearing portion 1j at which a first shaft portion 4d of the rotor 4 is rotatably supported.

The stationary ring 5 (ring shaped holding member) is made of, for example, plastic by an all-in-one molding technique and is provided with a first plinth portion 5e, a second plinth portion 5o, and a third plinth portion 5h. A first location pin 5f stands on the first plinth portion 5e, serving to determine the position of the first stator 6. A first groove 5g having a stage difference is provided in the outer side wall of the first plinth portion 5e. Likewise, a second location pin 5p stands on the second plinth portion 5o, serving to determine the position of the second stator 7. A second groove 5q having a stage difference is provided in the outer side wall of the second plinth portion 5o.

The third plinth portion 5h is provided with a hole 5j of larger diameter than the outer diameter of the rotor 4 by a predetermined amount and also with a first extending portion 5i for determining the position of the first stator 6 and a second extending portion 5m for determining the position of the second stator 7. Further, the third plinth portion 5h is provided with third, fourth and fifth grooves 5k, 5l and 5n (the fifth groove 5n is not shown) having stage differences.

The first stator 6 is made up, for example, by laminating silicon steel sheets and has an almost letter "U" shape as shown in FIG. 2. The free end portions of first and second armed portion 6b and 6d of the first stator 6 are provided with first and second magnetic pole portions 6a and 6c respectively confronting the outer periphery of the rotor 4 through a predetermined air gap. The first and second magnetic pole portions 6a and 6c of the first stator 6 have an open electrical angle of about 90° each and are spaced from each other by an electrical angle of 180°.

The first armature coil 8 is disposed on the first armed portion 6b of the first stator 6.

The first armature coil 8 is constructed by wiring a copper wire 8b around a bobbin 8a made of plastic and electrically connecting both ends of the copper wire 8b, or the beginning and terminating ends of the wiring, to leads 8c and 8d buried by pressure in the bobbin 8a by soldering or like means. Further, the first stator 6 is provided with a hole 6e for positioning.

The second stator 7, too, is made likewise, for example, by laminating silicon steel sheets and has an almost letter "U" shape as shown in FIG. 2. The free end portions of first and second armed portion 7b and 7d of the second stator 7 are provided with first and second magnetic pole portion 7a and 7c respectively confronting the outer periphery of the rotor 4 through a predetermined air gap. The first and second magnetic pole portion 7a and 7c of the second stator 7 have an open electrical angle of about 90° each and are spaced from each other by an electrical angle of 180°.

On the first armed portion 7b of the second stator 7, the second armature coil 9 is disposed.

The second armature coil 9 is constructed by wiring a copper wire 9b around a bobbin 9a made of plastic and electrically connecting both ends of the copper wire 9b, or the beginning and terminating ends of the wiring, to leads 9c and 9d buried by pressure in the bobbin 9a by soldering or like means. Further, the second stator 9 is provided with a hole 7e for positioning.

The first stator 6, when being assembled to the stationary ring 5, is adjusted in axial position by abutting on the first and third convex portions 5e and 5h of the stationary ring 5. The hole 6e of the first stator 6 is fitted on the first location pin 5f provided on the stationary ring 5, and, as shown in FIG. 2, the first extending portion 5i of the stationary ring 5 is fitted in the space between the first and second armed portions 6b and 6d of the first stator 6. Thus, the position of the first stator 6 in the direction perpendicular to the optical axis is determined.

The second stator 7, similarly to the first stator 6, when being assembled to the stationary ring 5, is adjusted in axial position by abutting on the second and third convex portions 5o and 5h of the stationary ring 5. The hole 7e of the second stator 7 is fitted on the second location pin 5p provided on the stationary ring 5, and, as shown in FIG. 2, the second extending portion 5m of the stationary ring 5 is fitted in the space between the first and second armed portions 7b and 7c of the second stator 7. Thus, the position of the second stator 7 in the direction perpendicular to the optical axis is determined.

The rotor 4 is made up of plastic magnet and constructed with first and second rotary shafts 4d and 4e, a gear 4c and a magnetic pole portion 4a, by the all-in-one molding technique. The magnetic pole portion 4a of the rotor 4 is made to get polar anisotropy so that it allows uniform eight poles to be formed in the outer peripheral portion, and likewise magnetized to form uniform eight magnetic poles.

Further, the magnetic pole portion 4a of the rotor 4 has its N and S poles provided with respective grooves 4b in its outer periphery at deviated positions from the centers of the poles in a clockwise direction or counterclockwise direction by a predetermined angle. The first rotary shaft 4d of the rotor 4 is rotatably supported by the first bearing 1j on the cam member 1. Meanwhile, the second rotary shaft 4e of the rotor 4 is rotatably supported by a second bearing 10a provided in the bearing member 10.

The bearing member 10 is made of, for example, plastic by the all-in-one molding, and has the bearing 10a by which the second rotary shaft 4e of the rotor 4 is rotatably supported, and first to fourth holes 10l, 10m, 10n and 10o. The leads 8c, 8d, 9c and 9d of the aforesaid first and second armature coils 8 and 9 are conducted through the first to fourth holes 10l, 10m, 10n and 10o to the back of the bearing member 10, so that they are connected to the flexible printed circuit board 11. The flexible printed circuit board 11 is connected to a drive circuit (not shown).

The bearing member 10 is provided with first to fourth projecting portions 10b, 10d, 10f and 10i (the second projecting portion 10d is not shown). These projecting portions are provided with first to fifth hooks 10c, 10e, 10g, 10h and 10j (the second hook 10e is not shown) respectively. These first to fifth hooks 10c, 10e, 10g, 10h and 10j engage respectively in the first to fifth grooves 5g, 5q, 5k, 5l and 5n having the stage differences. By the hooks engaging on the shoulders between the different stages, the bearing member 10 is fixedly secured to the stationary ring 5.

At this time, positioning of the bearing member 10 in the direction perpendicular to the optical axis is effected in such a way that the first location pin 5f of the stationary ring 5 is fitted in the first hole 10p for positioning of the bearing member 10, and the second location pin 5p of the stationary ring 5 is fitted in the hole 10q for positioning of the bearing member 10.

Hence, the cam member 1 and the stationary ring 5 are unified to each other with the rotary ring 3 sandwiched therebetween in fixedly secured relation by the screw fasteners 13. Also, the stationary ring 5 and the bearing member 10 are unified to each other with the stators 6 and 7 and the rotor 4 in the adjusted positions by the first to fifth hooks 10c, 10e, ... of the bearing member 10 respectively engaged in the grooves 5g, 5q, ... of the stationary ring 5. When the rotor 4 rotates, because its gear 4c is in mesh with the gear 3g of the rotary ring 3, the rotary ring 3 rotates in the predetermined direction, causing the light-blocking blades 2 to turn about the dowels 2a. Thus, the diaphragm is stopped up or down to adjust the light quantity.

Next, according to FIG. 2, the phase relationship between the first and second magnetic pole portions 6a and 6c of the first stator 6 and the first and second magnetic pole portions 7a and 7c of the second stator 7 is explained. As has been mentioned before, the magnetic pole portions 6a, 6c, 7a and 7c each have an open angle of 90° in terms of electrical angle. The first magnetic pole portion 6a and the second magnetic pole portion 6c of the first stator 6 are separated 180° in terms of electrical angle from each other. Also, the first magnetic pole portion 7a and the second magnetic pole portion 7c of the second stator 7, too, are separated 180° in terms of electrical angle from each other.

Also, the first magnetic pole portion 6a of the first stator 6 and the second magnetic pole portion 7c of the second stator 7 are separated 360° in terms of electrical angle from each other. This is equivalent to the phase difference of 90° between the first stator 6 and the second stator 7. Therefore, by using any one of the known drive methods for the 2-phase stepping motor, for example, 1-phase excitation, 2-phase excitation, or 1-2-phase excitation method, it is possible to move the diaphragm device to the predetermined aperture value in response to a command from a microcomputer incorporated in the camera and then return it to the full open aperture position.

Also, the eight grooves 4b equal to the number of magnet poles formed in the magnet pole surface of the rotor 4 have their directions of center P provided in the position deviating from the respective center directions Q of magnetization in the counterclockwise direction by $\theta°$.

Figure 3A:
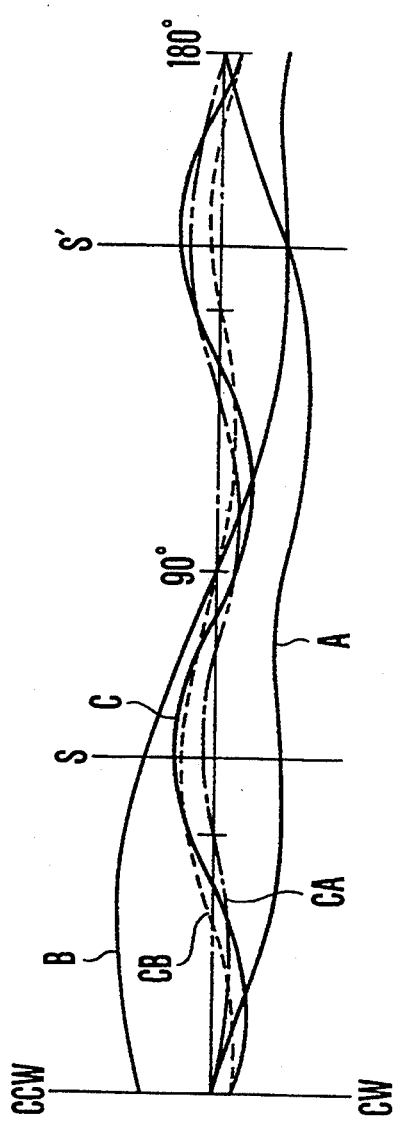
FIG. 3(A) is a graph for explaining the output torque, cogging torque and others in the device of the invention.
Figure 3B:
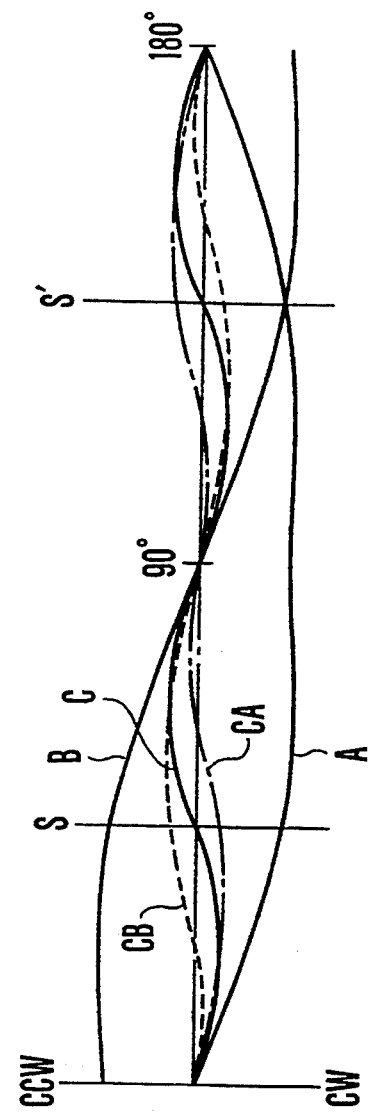
FIG. 3(B) is a graph for explaining the output torque, cogging torque and others in a case where the position of the groove in the rotor is different from that of the invention.

Next, by reference to FIG. 2, FIGS. 3(A) and FIG. 3(B), the cogging torque of the stepping motor which serves as drive source of the electromagnetically-driven light-quantity adjusting device according to the present embodiment is explained.

FIG. 3(A) is a graph illustrating the output torque and the cogging torque of each phase and the overall cogging torque in the stepping motor having the rotor provided with the grooves in the positions deviating from the center of magnetization of the rotor in the counterclockwise direction by a predetermined amount, which motor is used as a drive source of the electromagnetically-driven light-quantity adjusting device according to the present embodiment. FIG. 3(B) is a graph illustrating the output torque and the cogging torque of each phase and the overall cogging torque in a stepping motor having the rotor provided with the grooves in the centers of magnetization of the rotor. Here, the angle is shown in terms of electrical angle taking a pair of N and S of magnetization at 360°, and the direction is counterclockwise. An angle of $\theta°$ represents the position shown in FIG. 2, i.e., the position in which the direction of the center of magnetization coincides with the center of the magnetic pole of the first stator 6.

In FIGS. 3(A) and 3(B), "A" shows the torque with which the first stator 6 and the rotor 4 interact when current is supplied to the first coil 8 wound around the first stator 6 shown in FIG. 2 in such a manner that the first magnetic pole 6a is polarized to N, and "CA" shows the cogging torque with which the first stator 6 and the rotor 4 interact. Also, likewise, "B" shows the torque with which the second stator 7 and the rotor 4 interact when current is supplied to the second coil 9 in such a manner that the first magnetic pole portion 7a of the second stator 7 is polarized to S, and "CB" shows the cogging torque with which the second stator 7 and the rotor 4 interact. "C" shows the cogging torque produced by both of the first and second stators 6 and 7, or the sum of the aforesaid "CA" and "CB".

As shown in FIG. 3(B), unlike the embodiment, in a case where the center of the groove 4b coincides with the center of magnetization, it has been found that the stable stop position in the event that current has been supplied to the first coil 8 coincides with the stable stop position caused by the cogging torque produced by the first stator 6. It has also been found that the stable stop position in the event of supplying current to the second coil 9 coincides with the stable stop position caused by the cogging torque produced by the second stator 7. It has also been found that the stable stop points S and S' in the event of supplying current to the first and second coils 8 and 9 at once coincide with the unstable stop position caused by the cogging torque.

FIG. 3(A) is a graph showing each torque in a case where the groove of 40° wide in terms of electrical angle is displaced 20° in terms of electrical angle in the counterclockwise direction.

As shown in FIG. 3(A), in a case where the groove 4b is provided under such a condition that its center is displaced from the center of magnetization in the counterclockwise direction, it has been found that the cogging torque always takes positive values in the positions S and S' in which the rotor 4 stops under the condition that the first coil 8 and the second coil 9 both are supplied with current, or under the 2-phase current supply condition. It has also been found that the stable stop position caused by the cogging torque nearly coincides with the stable stop position defined by 90° or 180° of the rotor 4 under the 1-phase current supply condition.

In other words, in the electromagnetically driven light-quantity adjusting device according to the embodiment, even if the current supply to the motor is cut off when the rotor is in a position where it can stop stably under the current supply condition but it cannot stop stably under the current supply cutoff condition, the size of aperture opening does not change by more than one step either in a predetermined direction of smaller sizes or full open size. Therefore, it has been proven that even when the current supply to the electromagnetically driven light-quantity adjusting device is cut off at a time during making a long exposure, or in a like situation, the size of aperture opening is adjusted with high accuracy and reliability.

It is to be noted that though, in the above-described embodiment, the magnet of the rotor has been magnetized to 8 poles, the invention is applicable provided that the number of magnetized poles is no less than 4, as a matter of course.

Also, though the foregoing embodiment has been described in connection with an example of the diaphragm device for use in the interchangeable lens of the single-lens reflex camera, it is apparent that it can also be used as the shutter device for the compact camera.

As has been described above, according to the foregoing embodiment, the rotor is magnetized to $2n$ poles, and its outer periphery is formed to have grooves in the positions deviating from the centers of magnetization by a predetermined distance. Also, a pair of first and second stators each have first and second armed portions of almost letter "U" shape, and the free ends of these armed portions are provided with first and second magnetic poles having an angle of about 90° in terms of electrical angle in separation from each other by 180° in terms of electrical angle. An armature coil is wound around the first armed portion. Because these first and second stators are arranged in separation from each other by $(90+180 \times m)°$ $(m=0, 1, 2, 3, \ldots)$ in terms of electrical angle, many stable stop positions by the cogging torque can be obtained by the 2-dimensional arrangement of the stators. Moreover, the direction in which the rotor is pulled when the current supply is cut off in the stop position which is stable under the current supply condition can be specified. This produces an advantage that, in the event of making a long exposure, the battery is not consumed wastefully, while still permitting a high accuracy of aperture control to be insured easily and with high reliability.

Further, in the electromagnetically driven light-quantity adjusting device according to the embodiment, because the stators are able to collect the magnetic flux from the adjacent magnetic poles of the magnet of the rotor to each phase, as the magnet used is of polar anisotropy, it is possible to obtain a strong torque. This produces an advantage of driving a diaphragm device of large relative aperture quickly and easily.

What is claimed is:

1. A light-quantity adjusting device, comprising:
   (a) a light-blocking member supported to be moveable and arranged to be moved for adjusting a quantity of light;
   (b) a moving mechanism for moving said light-blocking member; and
   (c) a stepping motor serving as a drive source for said moving mechanism, said stepping motor including:
   (c-1) a rotor magnetized to $2n$ poles ($n=2, 3, 4, \ldots$), the center of magnetization in each pole of the rotor being deviated from the center of the pole in the same direction circumferentially of the rotor for each pole;
   (c-2) first and second stators each having a plurality of magnetic poles formed adjacent to the outer periphery of said rotor, said first and second stators being located so as to be mutually displaced by about 90° in terms of electrical angle and being provided with two magnetic poles located so as to be mutually displaced by about 180° in terms of electrical angle, and further said first stator and said second stator being located so as to be mutually displaced by about "$90° + 180° \times m$" ($m=0, 1, 2, \ldots$) in terms of electrical angle; and
   (c-3) first and second coils arranged on said first and second stators.

2. A device according to claim 1, wherein each pole of said rotor has a groove formed in a position deviating from the center of the pole in a circumferential direction by a predetermined angle, and wherein said groove renders the magnetic forces of either side of the pole center out of balance.

3. A device according to claim 1, wherein said moving mechanism includes a cam member, and wherein said light-blocking member is moved on the basis of cam displacement of said cam member.

4. A device according to claim 1, wherein said first and second stators are supported by a ring-shaped holder member and arranged so as to form an almost letter "U" shape.

5. A device according to claim 1, wherein said rotor has eight poles.

6. A device according to claim 1, wherein said first and second stators each are of almost letter "U" shape.

7. A device according to claim 1, wherein the control of current supply to said first and second coils is performed by a 1-phase current supply to said first coil, a 1-phase current supply to said second coil, a 2-phase current supply to said first and second coils, and no current supply.

8. A light-quantity adjusting device, comprising:
  (a) a light-blocking member supported to be moveable and arranged to be moved for adjusting a quantity of light;
  (b) a moving mechanism for moving said light-blocking member; and
  (c) a stepping motor serving as a drive source for said moving mechanism, said stepping motor including:
  (c-1) a rotor magnetized to $2n$ poles ($n=2, 3, 4, \ldots$), the center of magnetization in each pole of the rotor being deviated from the center of the pole in the same direction circumferentially of the rotor for each pole;
  (c-2) a plurality of stators each having a plurality of magnetic poles formed adjacent to the outer periphery of said rotor, said plurality of stators being located so as to be mutually displaced by about 90° in terms of electrical angle and being provided with two magnetic poles being located so as to be mutually displaced by about 180° in terms of electrical angle, and adjacent two of said plurality of stators being located so as to be mutually displaced by about "$90° + 180° \times m$" ($m=0, 1, 2, \ldots$) in terms of electrical angle; and
  (c-3) a plurality of coils arranged on said first and second stators.

9. A device according to claim 8, wherein each pole of said rotor has a groove formed in a position deviating from the center of the pole in a circumferential direction by a predetermined angle, and wherein said groove renders the magnetic forces of either side of the pole center out of balance.

10. A light-quantity adjusting device comprising:
  (a) a light-blocking member supported to be movable and arranged to be moved for adjusting a quantity of light;
  (b) a moving mechanism for moving said light-blocking member; and
  (c) a stepping motor serving as a drive source for said moving mechanism, said stepping motor including:
  (c-1) a rotor magnetized to $2n$ poles ($n=2, 3, 4, \ldots$), the center of magnetization in each pole of the rotor being deviated from the center of the pole in the same direction circumferentially of the rotor for each pole;
  (c-2) first and second stators each having a plurality of magnetic poles formed adjacent to the outer periphery of said rotor; and
  (c-3) first and second coils arranged on said first and second stators.

11. A device according to claim 10, wherein each pole of said rotor has a groove formed in a position deviating from the center of the pole in a circumferential direction by a predetermined angle, and wherein said groove renders the magnetic forces of either side of the pole center out of balance.

12. A device according to claim 10, wherein said moving mechanism includes a cam member, and wherein said light-blocking member is moved on the basis of cam displacement of said cam member.

13. A device according to claim 10, wherein said first and second stators are supported by a ring-shaped holder member and arranged so as to form an almost letter "U" shape.

14. A device according to claim 10, wherein said rotor has eight poles.

15. A device according to claim 10, wherein said first and second stators each are of almost letter "U" shape.

16. A device according to claim 10, wherein the control of current supply to said first and second coils is performed by a 1-phase current supply to said first coil, a 1-phase current supply to said second coil, a 2-phase current supply to said first and second coils, and no current supply.

* * * * *